US011172185B2

(12) United States Patent
Uemura

(10) Patent No.: US 11,172,185 B2
(45) Date of Patent: Nov. 9, 2021

(54) INFORMATION PROCESSING APPARATUS, INFORMATION PROCESSING METHOD, VIDEO PROCESSING SYSTEM, AND STORAGE MEDIUM

(71) Applicant: CANON KABUSHIKI KAISHA, Tokyo (JP)

(72) Inventor: Shinichi Uemura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/952,412

(22) Filed: Nov. 19, 2020

(65) Prior Publication Data

US 2021/0160473 A1 May 27, 2021

(30) Foreign Application Priority Data

Nov. 25, 2019 (JP) .............................. JP2019-212303

(51) Int. Cl.
*H04N 13/106* (2018.01)
*H04N 13/111* (2018.01)
*H04N 13/282* (2018.01)
*H04N 13/167* (2018.01)

(52) U.S. Cl.
CPC ......... *H04N 13/158* (2018.05); *H04N 13/111* (2018.05); *H04N 13/167* (2018.05); *H04N 13/282* (2018.05)

(58) Field of Classification Search
CPC .. H04N 13/158; H04N 13/167; H04N 13/282; H04N 13/111
USPC .......................................................... 348/43
See application file for complete search history.

(56) References Cited

U.S. PATENT DOCUMENTS

| 9,237,330 | B2* | 1/2016 | Wang | H04N 13/271 |
|---|---|---|---|---|
| 9,560,269 | B2* | 1/2017 | Baldwin | H04N 5/23222 |
| 9,967,531 | B2 | 5/2018 | Uemura et al. | |
| 2009/0051624 | A1* | 2/2009 | Finney | H05B 47/175 345/30 |
| 2013/0215220 | A1* | 8/2013 | Wang | H04N 13/271 348/43 |
| 2015/0248759 | A1* | 9/2015 | Lin | G06T 7/73 382/154 |

(Continued)

FOREIGN PATENT DOCUMENTS

JP 2008015756 A 1/2008

*Primary Examiner* — Tung T Vo
(74) *Attorney, Agent, or Firm* — Carter, DeLuca & Farrell LLP

(57) ABSTRACT

Time information of an output video and setting information of an imaging apparatus at least a switch time included in the time information are obtained. Setting information of a virtual viewpoint at the switch time included in the time information in which setting information of the virtual viewpoint at the switch time is set based on the obtained setting information of the imaging apparatus is obtained. An image processing apparatus generates a virtual viewpoint video based on the setting information of the virtual viewpoint. The image processing apparatus and a storage apparatus storing the captured video synchronously output frames of the same time based on the time information. The virtual viewpoint video and the captured video received from the image processing apparatus and the storage apparatus are outputted while being switched from one video to another at the switch time.

13 Claims, 7 Drawing Sheets

(56) References Cited

U.S. PATENT DOCUMENTS

| | | | |
|---|---|---|---|
| 2016/0156842 A1* | 6/2016 | Baldwin | H04N 5/23203 |
| | | | 348/218.1 |
| 2018/0288397 A1* | 10/2018 | Lee | H04N 13/254 |
| 2018/0359458 A1* | 12/2018 | Iwakiri | H04N 13/117 |
| 2018/0376122 A1* | 12/2018 | Park | H04N 13/239 |
| 2019/0037199 A1* | 1/2019 | Kato | G06F 3/04815 |
| 2019/0174109 A1* | 6/2019 | Yoshikawa | G06T 15/20 |
| 2019/0206027 A1 | 7/2019 | Uemura et al. | |
| 2019/0364265 A1* | 11/2019 | Matsunobu | H04N 21/21805 |
| 2020/0007834 A1 | 1/2020 | Uemura et al. | |

* cited by examiner

INFORMATION PROCESSING APPARATUS, INFORMATION PROCESSING METHOD, VIDEO PROCESSING SYSTEM, AND STORAGE MEDIUM

BACKGROUND OF THE INVENTION

Field of the Invention

A technique disclosed herein relates to video output using a virtual viewpoint video.

Description of the Related Art

A technique of generating a virtual viewpoint video by using a plurality of captured images (multi-viewpoint images) obtained by synchronously capturing images of a same object with multiple imaging apparatuses installed at different locations has been gaining attention. The virtual viewpoint video is a video expressing a view from a viewpoint of an imaging apparatus that is virtually arranged in a three-dimensional space and that does not actually exist (virtual viewpoint). According to such a technique of generating the virtual viewpoint video from the multi-viewpoint images, for example, highlight scenes of soccer or basketball can be viewed from various angles. Accordingly, it is possible to give greater uplifting feeling to viewers than a normal video. Japanese Patent Laid-Open No. 2008-015756 discloses a technique in which multiple imaging apparatuses are arranged to surround an object and a virtual viewpoint video from any viewpoint is generated by using multi-viewpoint images of the object synchronously captured by the multiple imaging apparatuses.

In the case where an event such as soccer synchronously captured from multiple viewpoints is captured also by using imaging apparatuses such as broadcast imaging apparatuses, it is possible to create a video in which the virtual viewpoint video and a captured video generated by one of the imaging apparatuses (hereafter, referred to as captured video) are combined. For example, a bird's-eye-view shot capturing motions of all players in a scene in which the players carry a ball from a centerline toward a goal in the virtual viewpoint video and an observer viewpoint shot from an eye level of a goalkeeper in a shoot scene in which the ball passes by the goalkeeper are connected in this order. Then, a shot capturing detailed expressions of the goalkeeper and the kicker in high-image quality zoom in the captured video is connected next to the obtained shot in the virtual viewpoint video to create a series of video of a goal scene. A video experience with a greater feeling of presence can be expected to be provided to a viewer by combining a high-definition captured video and virtual viewpoint videos from a viewpoint of each player and a bird's-eye-viewpoint capturing multiple players that cannot be captured by a normal imaging apparatus as described above.

However, in a conventional technique, the virtual viewpoint video and the captured video cannot be sometimes outputted while being smoothly switched from one video to another. For example, there is a case where a captured video captured in real time and a virtual viewpoint video generated frame by frame from multi-viewpoint images are outputted while being switched from one video to another. In this case, there is a risk that a discontinuous video is outputted at a timing of switching due to delay in output of the virtual viewpoint video with respect to output of the captured video and gives a feeling of strangeness to the viewer.

SUMMARY OF THE INVENTION

The disclosed technique is an information processing apparatus comprising: an obtaining unit that obtains time information for specifying a switch time for switching between a virtual viewpoint video generated based on a plurality of captured images captured by a plurality of imaging apparatuses and a captured video captured by a predetermined imaging apparatus; a determining unit that determines, based on a position and a direction of the predetermined imaging apparatus capturing a video corresponding to the switch time specified based on the time information, a position of a virtual viewpoint and a direction of view from the virtual viewpoint used for generating the virtual viewpoint video corresponding to the switch time specified based on the obtained time information; a switching unit that switches, as an outputted video, between the virtual viewpoint video corresponding to the determined position of the virtual viewpoint and the determined direction of view from the virtual viewpoint and the captured video corresponding to the switch time captured by the predetermined imaging apparatus.

Further features of the present invention will become apparent from the following description of exemplary embodiments with reference to the attached drawings.

DESCRIPTION OF THE EMBODIMENTS

Embodiments are described below with reference to the drawings. Note that the configurations described in the following embodiments are merely an example and the disclosed technique is not limited to the illustrated configurations.

Embodiment 1

<Configurations of Video Processing System and Video Switching Apparatus>

Figure 1:
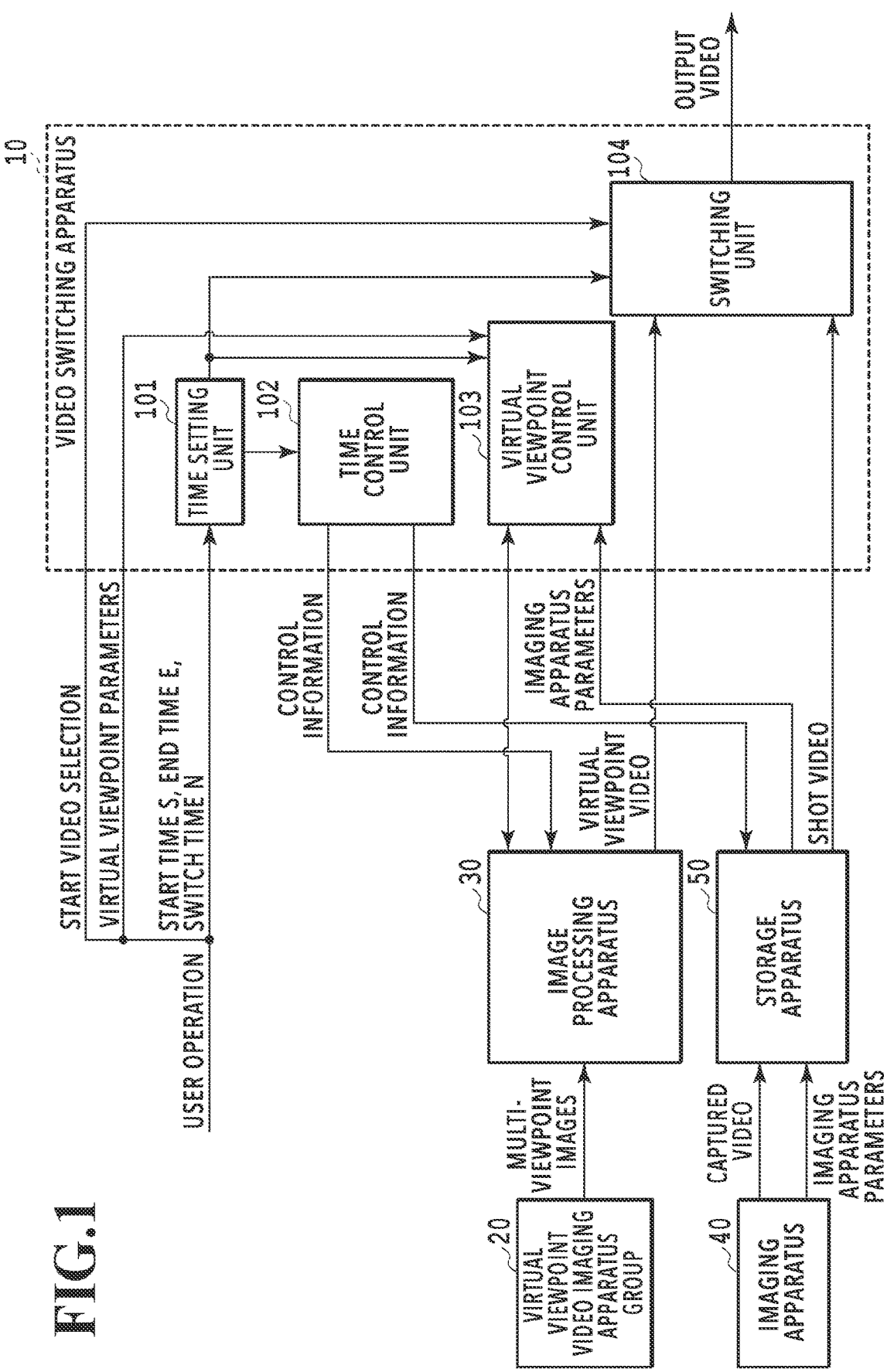
FIG. 1 is an overall configuration diagram of a video processing system according to Embodiment 1.

FIG. 1 is an overall configuration diagram of a video processing system according to Embodiment 1.

The video processing system includes a video switching apparatus 10, a virtual viewpoint video imaging apparatus group 20, an image processing apparatus 30, an imaging apparatus 40, and a storage apparatus 50.

The virtual viewpoint video imaging apparatus group 20 is an imaging apparatus group including multiple imaging apparatuses installed to surround a game field or the like.

The multiple imaging apparatuses are imaging apparatuses that are different from the imaging apparatus 40 to be described later and that capture multi-viewpoint images used to generate a virtual viewpoint video. The virtual viewpoint video imaging apparatus group 20 outputs images captured by the respective imaging apparatuses to the image processing apparatus 30.

The image processing apparatus 30 generates a virtual viewpoint video from a virtual viewpoint on a virtual viewpoint path by creating a three-dimensional model from the multi-viewpoint images and mapping a texture on the three-dimensional model. The image processing apparatus 30 outputs the generated virtual viewpoint video to the video switching apparatus 10 or the storage apparatus 50.

The imaging apparatus 40 is an imaging apparatus of a broadcast station arranged beside the game field or the like, an imaging apparatus suspended from an upper level of a stadium via wires (cable cam), or the like and an imaging apparatus operator controls the position, the direction (orientation), and the angle of view of the imaging apparatus. The imaging apparatus 40 outputs a captured video and a time (time code) to the storage apparatus 50. Moreover, the imaging apparatus 40 includes measurement devices such as a GPS receiver and a gyroscope sensor and the measurement devices determine the position and direction of the imaging apparatus. Various setting values of the imaging apparatus (imaging apparatus parameters) including the position, direction, and angle of view of the imaging apparatus are outputted to the storage apparatus 50 as setting information of the imaging apparatus. Although an example including only one imaging apparatus is illustrated in the embodiment, there may be multiple imaging apparatuses. Moreover, the imaging apparatus parameters may include information on specifications of the imaging apparatus such as a focal distance of a lens of the imaging apparatus and a sensor size of the imaging apparatus.

The storage apparatus 50 stores the captured video and the aforementioned imaging apparatus parameters outputted from the imaging apparatus 40 and also stores the virtual viewpoint video in the case where the storage apparatus 50 receives the virtual viewpoint video from the image processing apparatus 30. The storage apparatus 50 outputs the captured video and the imaging apparatus parameters to the video switching apparatus 10 depending on control information outputted from the video switching apparatus 10 to be described later, and also outputs the virtual viewpoint video to the video switching apparatus 10 in the case where the virtual viewpoint video is stored in the storage apparatus 50.

The video switching apparatus 10 includes a time setting unit 101, a time control unit 102, a virtual viewpoint control unit 103, and a switching unit 104.

The time setting unit 101 receives identifiers such as time codes of a start time S, an end time E, and a switch time N in the virtual viewpoint video and the captured video from a user. The identifiers received by the time setting unit 101 are not limited to times and may be videos or images (frames) to which the times are assigned. For example, the configuration may be such that the user specifies the frames corresponding to the start time S, the end time E, and the switch time N on a screen of a GUI or the like while referring to the captured video and the time setting unit 101 obtains the specified frames and extract time information from the frames. The time setting unit 101 outputs the obtained time information to the time control unit 102, the virtual viewpoint control unit 103, and the switching unit 104.

The time control unit 102 obtains the start time S from the time information received from the time setting unit 101 and outputs control information used to synchronize the time in the virtual viewpoint video and the time in the captured video, to the image processing apparatus 30 and the storage apparatus 50. The time control unit 102 allows frames of the same time in the virtual viewpoint video and the captured video to be synchronized with each other and outputted to the switching unit 104 by using the control information. Details are described later by using FIG. 3.

The virtual viewpoint control unit 103 obtains the switch time N from the time information received from the time setting unit 101 and obtains the imaging apparatus parameters at the switch time N from the storage apparatus 50. The virtual viewpoint control unit 103 sets virtual viewpoint parameters (setting information of a virtual viewpoint such as the position of the virtual viewpoint, the direction of view from the virtual viewpoint, and the angle of view) at the switch time N based on the obtained imaging apparatus parameters at the switch time N. The user is allowed to set any desired virtual viewpoint parameters at times other than the switch time N and the virtual viewpoint control unit 103 obtains the virtual viewpoint parameters from the user. Then, the virtual viewpoint control unit 103 outputs the virtual viewpoint parameters corresponding to all of times included in the obtained time information to the image processing apparatus 30 as control information. Details are described later by using FIG. 3.

The switching unit 104 obtains the switch time N from the time information received from the time setting unit 101, obtains start video selection information that is set by the user and that specifies one of the captured video and the virtual viewpoint video to be used as a start video, and performs switching between the virtual viewpoint video and the captured video. Details are described later by using FIG. 3.

Figure 2:
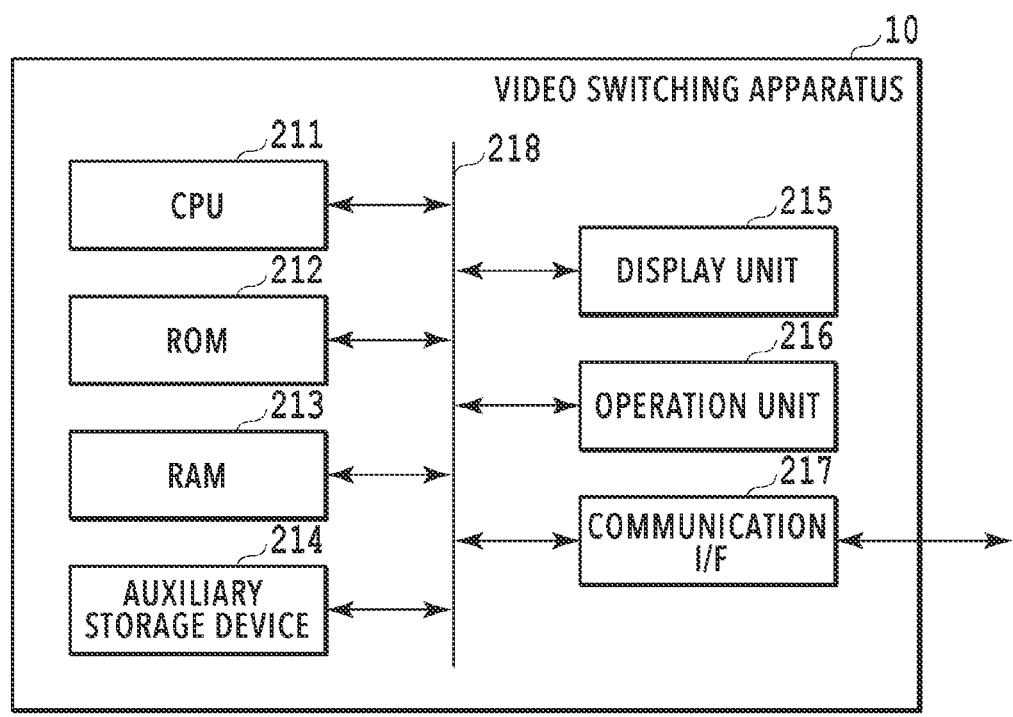
FIG. 2 is a hardware configuration diagram of the video processing system according to Embodiment 1.

FIG. 2 is a hardware configuration diagram of the video switching apparatus 10 according to Embodiment 1. A hardware configuration of the image processing apparatus 30 is similar to the configuration of the video switching apparatus 10 to be described below. The video switching apparatus 10 includes a CPU 211, a ROM 212, a RAM 213, an auxiliary storage device 214, a display unit 215, an operation unit 216, a communication I/F 217, and a bus 218.

The CPU 211 controls the entire video switching apparatus 10 by using computer programs and data stored in the ROM 212 and the RAM 213 to implement the functions of the video switching apparatus 10 illustrated in FIG. 1. The configuration may be such that the information processing apparatus 200 includes one or multiple pieces of dedicated hardware different from the CPU 211 and the dedicated hardware at least partially executes the processing of the CPU 211. Examples of the dedicated hardware include an application specific integrated circuit (ASIC), a field programmable gate array (FPGA), a digital signal processor (DSP), and the like.

The ROM 212 stores programs and the like that do not have to be changed. The RAM 213 temporarily stores programs and data supplied from the auxiliary storage device 214 and data and the like supplied from the outside via the communication I/F 217. The auxiliary storage device 214 is formed of, for example, a hard disk drive or the like and stores various pieces of data such as image data and audio data.

The display unit 215 is formed of, for example, a liquid crystal display (LCD), an organic electroluminescence display (OELD), or the like and displays a graphical user interface (GUI) or the like that is used by the user to operate the video switching apparatus 10.

The operation unit 216 is formed of, for example, a keyboard, a mouse, a joystick, a touch panel, and the like. The operation unit 216 receives operations made by the user and inputs various instructions into the CPU 211. The CPU 211 operates as a display control unit that controls the display unit 215 and an operation control unit that controls the operation unit 216.

The communication I/F 217 is used to perform communication with apparatuses outside the video switching apparatus 10. For example, in the case where the video switching apparatus 10 is connected to the outside apparatuses via wires, a communication cable is connected to the communication IF 217. In the case where the video switching apparatus 10 has a function of wirelessly communicating with the outside apparatuses, the communication I/F 217 includes an antenna.

The bus 218 communicably connects various units of the video switching apparatus 10 to one another and transmits information.

Although the display unit 215 and the operation unit 216 are present inside the video switching apparatus 10 in the embodiment, at least one of the display unit 215 and the operation unit 216 may be present outside the video switching apparatus 10 as a separate device.

<Outline of Switch Control Using Specified Time>

Figure 3:
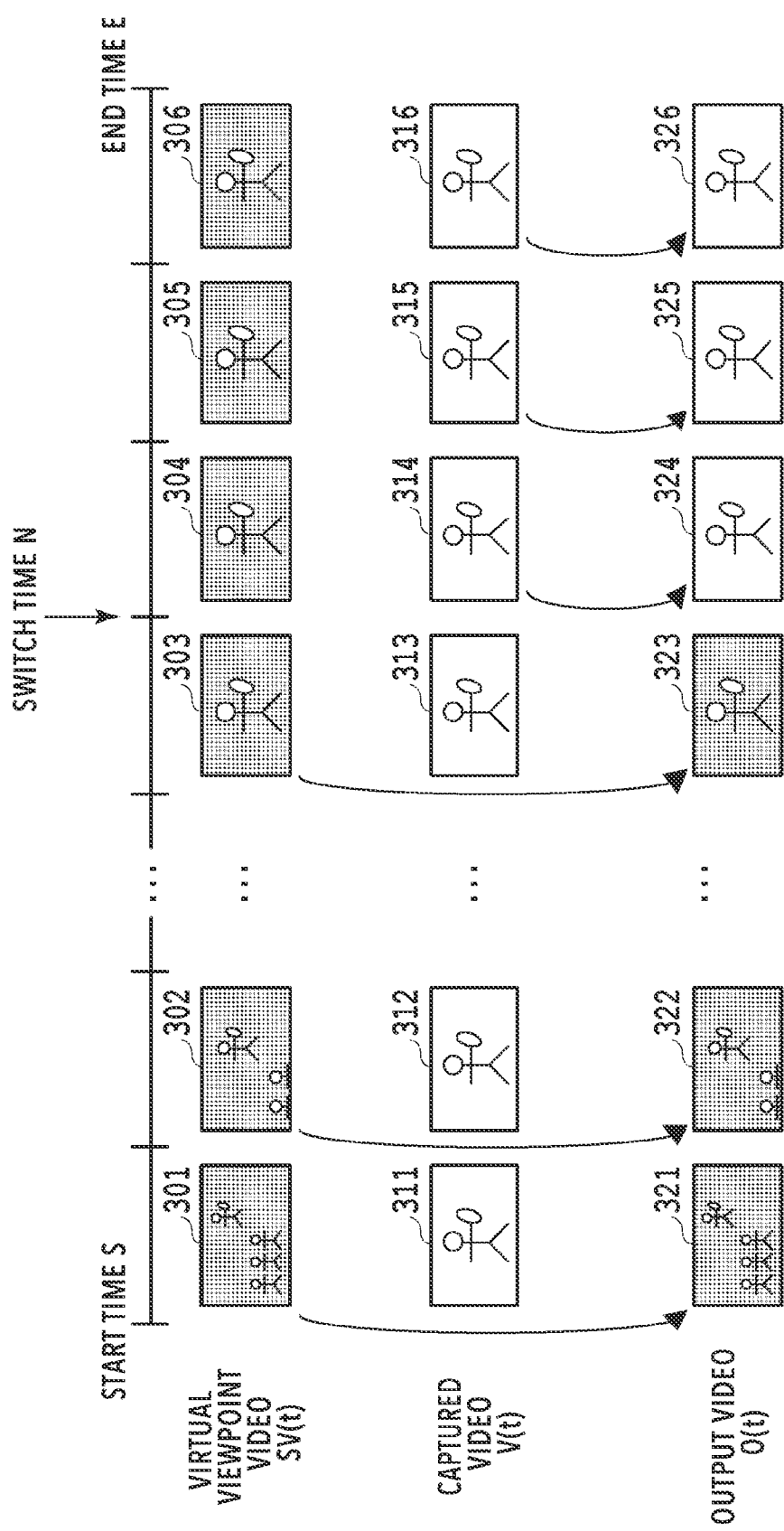
FIG. 3 is an explanatory diagram of an outline of processing of switch control according to Embodiment 1.

FIG. 3 illustrates an outline of processing performed in the case where the virtual viewpoint video is set as the start video and the captured video is set as the video after switching.

The switch time N indicates a timing which is set by the user in the time setting unit 101 and at which the switching between the virtual viewpoint video and the captured video is performed.

Frames 301 to 306 in the virtual viewpoint video illustrate the virtual viewpoint video outputted from the image processing apparatus 30 or the storage apparatus 50 frame by frame. The image processing apparatus 30 generates the virtual viewpoint video based on the virtual viewpoint parameters from the start time S to the end time E that define the virtual viewpoint path included in the control information outputted from the virtual viewpoint control unit 103. The virtual viewpoint parameters are various setting values such as the position of the virtual viewpoint, the direction of view from the virtual viewpoint, the angle of view of the virtual viewpoint, and the like that define a composition of the virtual viewpoint video, and correspond to the imaging apparatus parameters in the captured video. In the embodiment, the virtual viewpoint parameters at the switch time N among the virtual viewpoint parameters from the start time S to the end time E are set to the imaging apparatus parameters at the switch time N read from the storage apparatus 50 by the virtual viewpoint control unit 103. The composition of the virtual viewpoint video at the switch time N can be thereby made to match the composition of the captured video. The user is allowed to set any desired virtual viewpoint parameters at times other than the switch time N.

Frames 311 to 316 in the captured video illustrate the captured video outputted from the storage apparatus 50 frame by frame.

Frames 321 to 326 in an output video are an output video formed of frames in the virtual viewpoint video and frames in the captured video that are selected by the switching unit 104 of the video switching apparatus 10 and outputted from the video switching apparatus 10. In FIG. 3, the frames 301 to 303 in the virtual viewpoint video are selected as the frames 321 to 323 in the output video and, from the switch time N the frames 314 to 316 in the captured video are selected as the frame 324 to 326 in the output video.

Relationships between the output video outputted by the aforementioned video switching and each of the virtual viewpoint video and the captured video are described in Formula 1. In Formula 1, t is a variable incremented frame by frame, N is the switch time, SV(t) is a frame of the time t in the virtual viewpoint video, V(t) is a frame of the time t in the captured video, and O(t) is a frame of the time t in the output video.

$$O(t) = \begin{cases} SV(t) & (\text{if } t < N), \\ V(t) & (\text{if } t \geq N), \end{cases} \quad \text{Formula 1}$$

In order to achieve the aforementioned processing, the time control unit 102 first outputs common time information and a video synchronization signal as the control information from the video switching apparatus 10 to the image processing apparatus 30 and the storage apparatus 50, based on the start time S set in the time setting unit 101. The image processing apparatus 30 and the storage apparatus 50 can thereby output the virtual viewpoint video and the captured video whose times t are aligned to the video switching apparatus 10.

Since generation of the virtual viewpoint video includes processing of generating a three-dimensional model, mapping a texture, and the like, the processing time for the generation of the virtual viewpoint video is assumed to be longer than the processing time for generation of the captured video by the imaging apparatus 40. Thus, in the case where there is a delay only in the virtual viewpoint video inputted into the video switching apparatus 10 and the switching unit 104 performs the switching from the virtual viewpoint video to the captured video without any further operation, drop frame occur in the output video.

Accordingly, the frames in the virtual viewpoint video and the frames in the captured video inputted into the video switching apparatus 10 are aligned to be the frames of the same time. The captured video outputted from the imaging apparatus 40 is temporarily saved in the storage apparatus 50 and the virtual viewpoint video and the captured video are synchronously outputted from the image processing apparatus 30 and the storage apparatus 50 by using the video synchronization signal.

A timing of the video synchronization signal is set such that the image processing apparatus 30 can output the virtual viewpoint video without a delay. Alternatively, the virtual viewpoint video may be buffered in the image processing apparatus 30 such that the virtual viewpoint video can be outputted without a delay according to the video synchronization signal.

For example, in broadcasting of the captured video, the video is sometimes outputted while being purposely delayed for several seconds from the capturing to avoid unintentional broadcasting of video contents that should not be broadcasted. In such a case, the output of the virtual viewpoint video may also be delayed in synchronization with the captured video. Moreover, for example, the delay relating to the generation of the virtual viewpoint video sometimes changes depending on the video contents. In such a case, the output of the virtual viewpoint video may be always delayed by a predetermined time period equal to or greater than the maximum delay relating to the generation of the virtual viewpoint video to prevent drop frame or the like in the outputted video.

In the case where the time t reaches the switch time N, the switching unit 104 switches the video from the virtual viewpoint video to the captured video, from the frame 324 of the output video.

<Processing>

Figure 4:
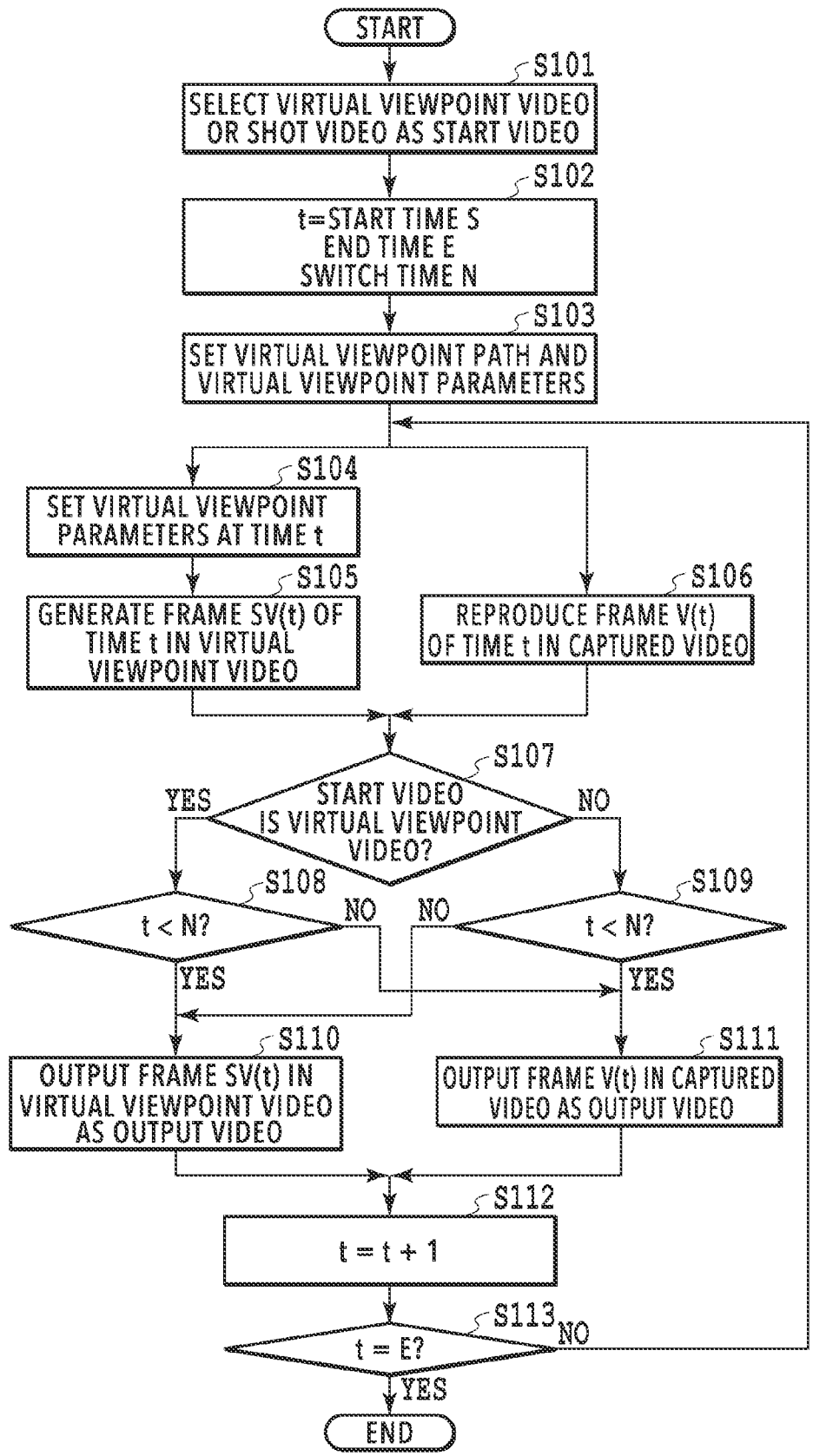
FIG. 4 is a flowchart illustrating processing steps of the switch control according to Embodiment 1.

Next, processing steps of the video switching apparatus 10 according to the embodiment are described with reference to the flowchart of FIG. 4. This processing starts in the case where the user instructs to start displaying of a scene including switching between the virtual viewpoint video and the captured video.

In S101, the switching unit 104 of the video switching apparatus 10 obtains start video information indicating one of the virtual viewpoint video and the captured video to be used as the start video from the user. Note that the switching unit 104 may hold the start video information set in advance, instead of obtaining the start video information from the user.

In S102, the time setting unit 101 of the video switching apparatus 10 obtains the time information including the start time S, the end time E, and the switch time N of the output video to be outputted from the switching unit 104 from the user.

The time setting unit 101 outputs the set time information to the time control unit 102, the virtual viewpoint control unit 103, and the switching unit 104. The time control unit 102 adds the time information into the control information to be described later and outputs the control information to the image processing apparatus 30 and the storage apparatus 50. In this case, the variable t is defined as the time information that specifies the frame to be outputted and that is common among the image processing apparatus 30, the storage apparatus 50, and the video switching apparatus 10 and t=start time S is set.

In S103, the virtual viewpoint control unit 103 obtains the virtual viewpoint parameters corresponding to the received time information. The virtual viewpoint control unit 103 first sets a start position or an end position of the virtual viewpoint path to a position of the imaging apparatus depending whether the start video set in S101 is the virtual viewpoint video or the captured video. Moreover, the virtual viewpoint control unit 103 reads the imaging apparatus parameters at the switch time N from the storage apparatus 50 and sets the virtual viewpoint parameters at the start position or the end position of the virtual viewpoint path based on the read imaging apparatus parameters at the switch time N.

Description is given by using the example illustrated in FIG. 3. In the case where the start video is the virtual viewpoint video, the virtual viewpoint control unit 103 sets the end position of the virtual viewpoint path to the position of the imaging apparatus and sets the virtual viewpoint parameters at the end position of the virtual viewpoint path to the imaging apparatus parameters at the switch time N. Meanwhile, in the case where the start video is the captured video, the virtual viewpoint control unit 103 sets the start position of the virtual viewpoint path to the position of the imaging apparatus and sets the virtual viewpoint parameters at the start position of the virtual viewpoint path to the imaging apparatus parameters at the switch time N.

The user sets the start position or the end position of the virtual viewpoint path which is not set to the position of the imaging apparatus and for which the virtual viewpoint parameters are not set to the imaging apparatus parameters, in the virtual viewpoint control unit 103.

In S104, the virtual viewpoint control unit 103 outputs the virtual viewpoint path and the virtual viewpoint parameters (position of the virtual viewpoint, direction of view from the virtual viewpoint, angle of view, and the like) at the time t set in S103 as the control information to the image processing apparatus 30.

In S105, the image processing apparatus 30 generates the frame of the time t in the virtual viewpoint video based on the control information received from the virtual viewpoint control unit 103 and outputs the frame to the switching unit 104.

In S106, the virtual viewpoint control unit 103 reads the frame of the time t in the captured video from the storage apparatus 50 and outputs the frame to the switching unit 104.

In S107, the switching unit 104 proceeds to S108 in the case where the start video set in S101 is the virtual viewpoint video and proceeds to S109 in the case where the start video set in S101 is the captured video.

In S108, the switching unit 104 determines whether the time t is earlier than the switch time N. The switching unit 104 causes the processing to proceed to S110 in the case where the time t is earlier than the switch time N and proceed to S111 in the case where the time t is the switch time N or later.

In S109, the switching unit 104 determines whether the time t is earlier than the switch time N. The switching unit 104 causes the processing to proceed to Sill in the case where the time t is earlier than the switch time N and proceed to S110 in the case where the time t is the switch time N or later.

In S110, the switching unit 104 selects the frame SV(t) of the time t in the virtual viewpoint video and outputs the frame SV(t) as the output video.

In S111, the switching unit 104 selects the frame V(t) of the time t in the captured video and outputs the frame V(t) as the output video.

In S112, the time control unit 102 advances the time t. The time is incremented at a timing of a vertical synchronizing signal generated by the time control unit 102 of the video switching apparatus 10.

In S113, the time control unit 102 returns to S104 and S106 in the case where the time t is earlier than the end time E and terminates the processing in the case where the time t reaches the end time E.

In the embodiment, strangeness felt by the viewer in the switching between the videos can be reduced by performing the switching after aligning the time t in the captured video and the time t in the virtual viewpoint video and matching the composition of the virtual viewpoint video with the composition of the captured video by the switch time N as described above.

Embodiment 2

<Configurations of Video Processing System and Video Switching Apparatus>

In Embodiment 1, description is given of an example in which the video switching is performed after the time in the virtual viewpoint video and the time in the captured video are synchronized and the composition of the virtual viewpoint is matched with the composition of the captured video. However, a degree of differences between the frame before the video switching and that after the video switching is sometimes large enough to give feeling of strangeness to the viewer depending on the accuracy of the imaging apparatus parameters and the quality of the virtual viewpoint video. Specifically, there are differences in the obtained imaging apparatus parameters, differences in shapes and sizes of objects due to errors in three-dimensional models generated from the multi-viewpoint images captured by the imaging apparatus group, differences between colors and material appearances in the captured video and colors and material appearances of textures mapped on the three-dimensional models, and the like. These differences sometimes appear as "flickering" or "lagging" in the video switching and give the feeling of strangeness to the viewer. One of the reasons why these differences give the feeling of strangeness is that instantaneous switching between videos that are differently made causes differences between frames to be more recognizable to the viewer.

Accordingly, in the embodiment, in the case where the switching between the virtual viewpoint video and the captured video is to be performed, a blending is performed for multiple frames in the switching and the switching between the videos is performed stepwise by gradually changing a ratio of blend. This can reduce the differences between the frames in the output video and thus reduce the strangeness felt by the viewer.

Figure 5:
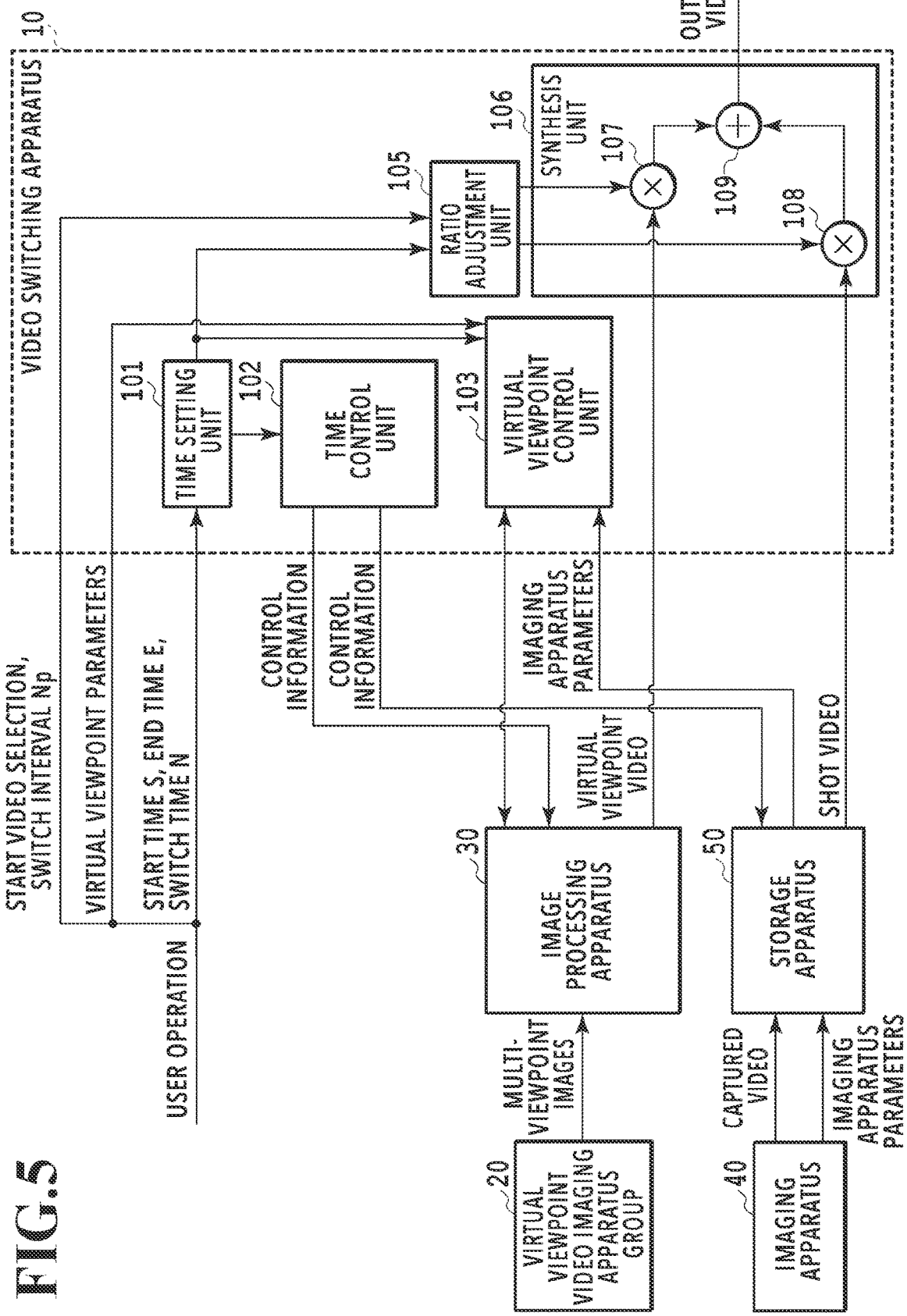
FIG. 5 is an overall configuration diagram of a video processing system according to Embodiment 2.

FIG. 5 is an overall configuration diagram of the video processing system according to Embodiment 2. The configuration of the system in Embodiment 2 is the same as that in Embodiment 1 except for the point that the system in Embodiment 2 includes a ratio adjustment unit 105 and a synthesis unit 106 instead of the switching unit 104.

The ratio adjustment unit 105 adjusts a switch ratio of the virtual viewpoint video and the captured video based on the switch time N received from the time setting unit 101 and the start video selection information and a switch interval Np received from the user. Details are described later by using FIG. 6.

The synthesis unit 106 is formed of multipliers 107, 108 and an adder 109 and multiples each of the virtual viewpoint video and the captured video by a corresponding one of numbers in the switch ratio outputted from the ratio adjustment unit 105 in the multipliers 107, 108, synthesizes the videos in the adder 109, and outputs the synthesized video. Details are described later by using FIG. 6.

<Outline of Time Specification and Control of Switching by Video Synthesis>

Figure 6:
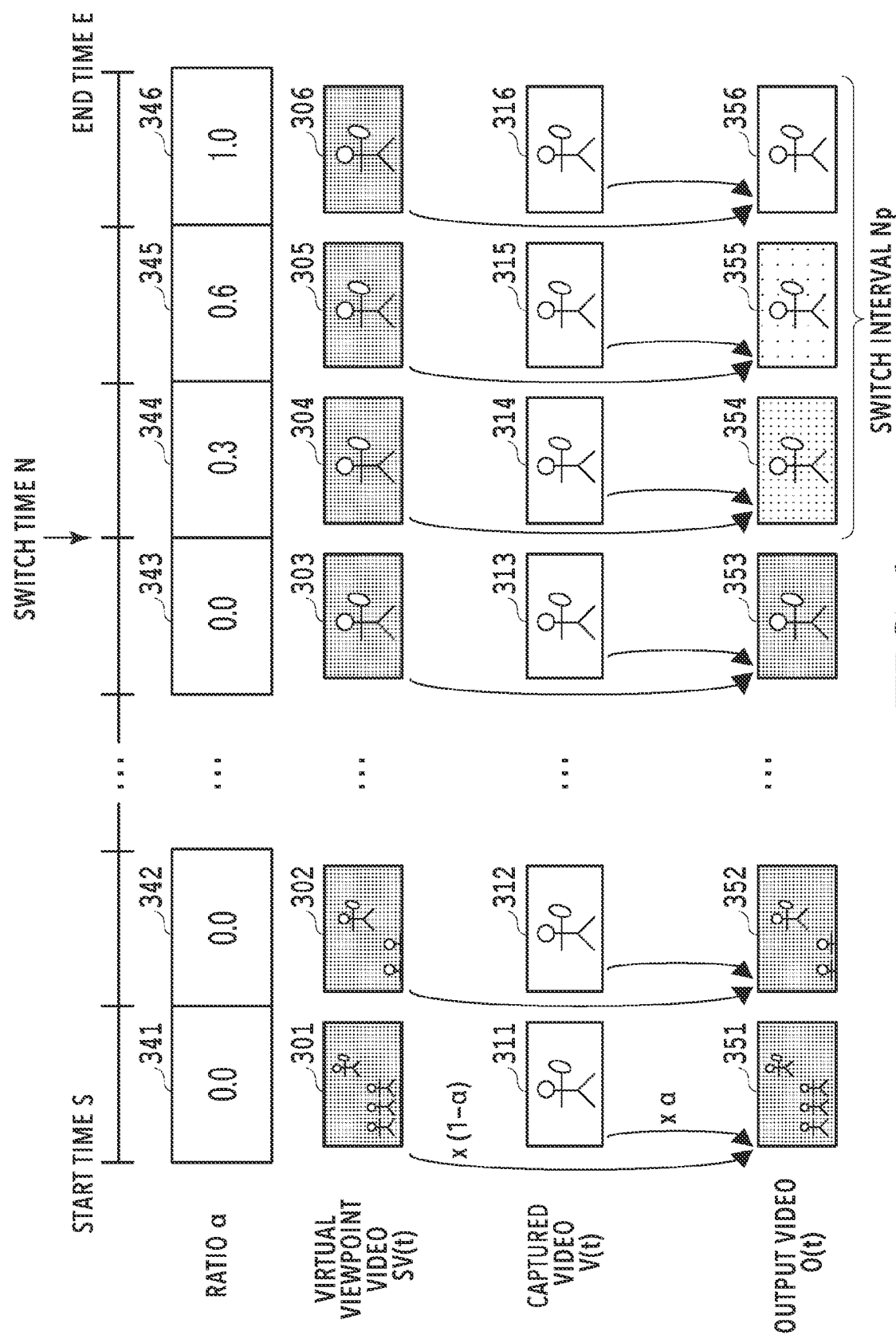
FIG. 6 is an explanatory diagram of an outline of processing of switch control according to Embodiment 2.

FIG. 6 illustrates an outline of processing performed in the case where the start video is the virtual viewpoint video, the video after the switching is the captured video, and the switch interval Np (the number of frames required for the switching) is "3". Description of the virtual viewpoint video and the captured video is the same as that in Embodiment 1.

Coefficients α 341 to 346 are synthesis ratios adjusted for the respective frames in the ratio adjustment unit 105. The coefficient α is increased stepwise from "0" to "1" from the switch time N. The coefficient α is increased for each frame with an inverse of the switch interval Np set by the user used as an increase value. In this embodiment, since the switch interval is set to "3", the increase value of the coefficient is about 0.3.

Frames 351 to 356 of the output video are a video obtained by adding together the virtual viewpoint video and the captured video in the synthesis unit 106 depending on the synthesis ratio set in the ratio adjustment unit 105. The synthesis ratio of the captured video is increased stepwise from the output video 354 after the switch time N and only the frame 316 of the captured video is outputted in the output video 356.

Relationships among the virtual viewpoint video, the captured video, and the output video described above are illustrated in Formula 2 and Formula 3. In Formula 2 and Formula 3, t is the variable incremented for each frame, N is the switch time, Np is the switch interval, SV(t) is the virtual viewpoint video, V(t) is the captured video, and O(t) is the output video.

$$O(t) = SV(t) \times (1 - \alpha(t)) + V(t) \times \alpha(t) \qquad \text{Formula 2}$$

$$\alpha(t) = \begin{cases} 0 & (\text{if } t \leq N), \\ (t-N)/Np & (\text{if } N < t \leq N + Np), \\ 1 & (\text{if } N + Np < t) \end{cases} \qquad \text{Formula 3}$$

<Processing>

Figure 7:
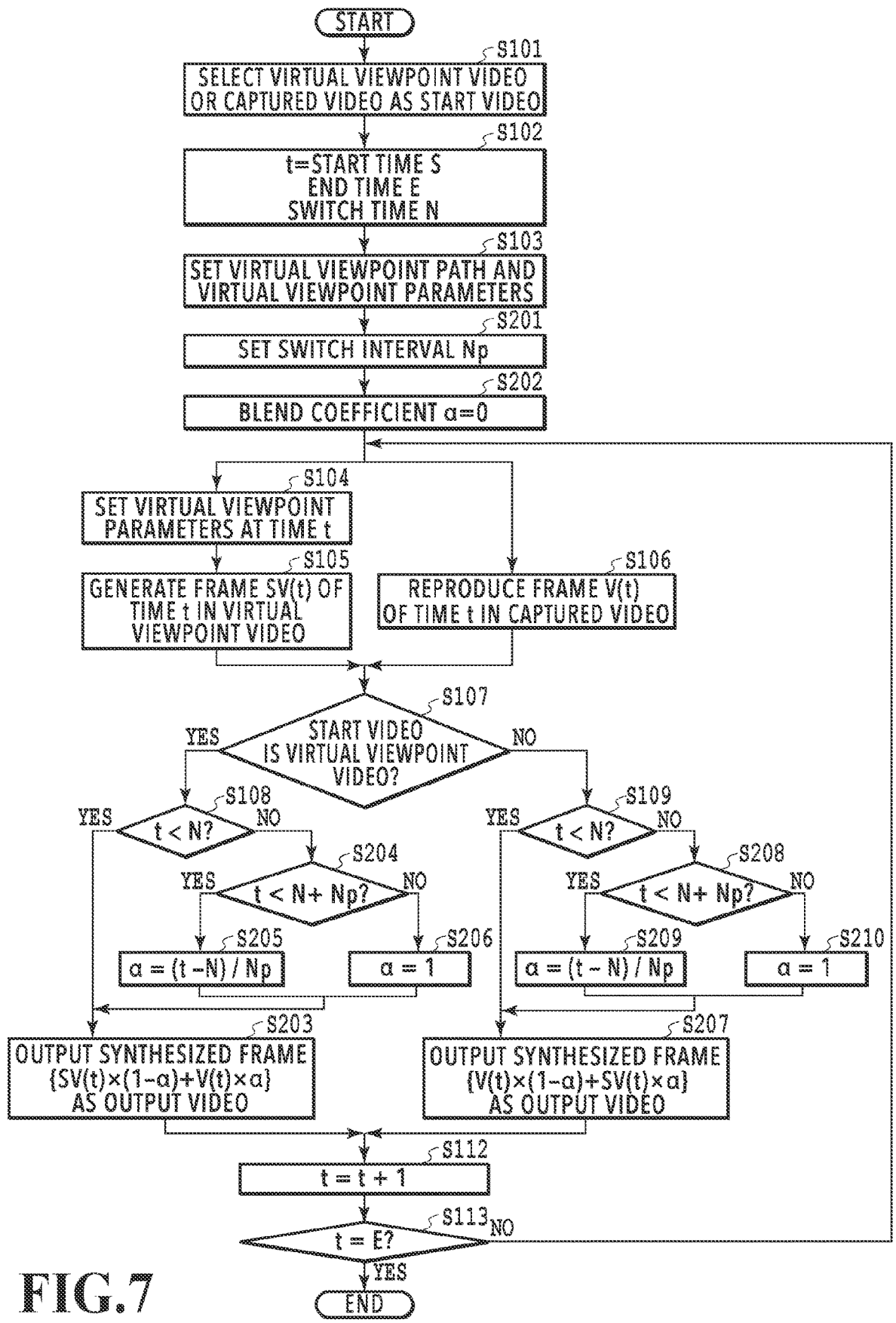
FIG. 7 is a flowchart illustrating processing steps of the switch control according to Embodiment 2.

Next, processing steps of the video switching apparatus 10 according to the embodiment are described with reference to the flowchart of FIG. 7. This processing starts in the case where the user instructs to start displaying of a scene including switching between the virtual viewpoint video and the captured video.

S101 to S103 are the same as those in Embodiment 1.

In S201, the user sets the switch interval Np for the ratio adjustment unit 105. A predetermined switch interval Np may be set in advance in the ratio adjustment unit 105, instead of being set by the user.

In S202, the ratio adjustment unit 105 initializes the coefficient α to "0"

S104 to S109 are the same as those in Embodiment 1.

In the case where the start video set in S101 is the virtual viewpoint video and the time t is earlier than the switch time N in S108, the processing proceeds to S203. Meanwhile, in the case where the time t is the switch time N or later, the processing proceeds to S204.

In S203, the ratio adjustment unit 105 inputs 1−α(t) into the multiplier 107 of the synthesis unit 106 and inputs α(t) into the multiplier 108. The synthesis unit 106 adds together the frame SV(t) in the virtual viewpoint video and the frame V(t) in the captured video at a ratio of (1−α) to α.

In S204, the ratio adjustment unit 105 proceeds to S205 in the case where an elapsed period from the switch time N to the time t is less than the switch time N and proceeds to S206 in the case where the elapsed period from the switch time N to the time t is the switch interval Np or more.

In S205, the ratio adjustment unit 105 updates the coefficient α to (t−N)/Np according to Formula 3 described above and proceeds to S203.

In S206, the ratio adjustment unit 105 updates the coefficient α to "1" according to Formula 3 described above and proceeds to S203.

In the case where the start video set in S101 is the captured video and the time t is earlier than the switch time N in S109, the processing proceeds to S207. Meanwhile, in the case where the time t is the switch time N or later, the processing proceeds to S208.

In S207, the ratio adjustment unit 105 inputs α(t) into the multiplier 107 of the synthesis unit 106 and inputs 1−α(t) into the multiplier 108. The synthesis unit 106 adds together the frame V(t) in the captured video and the frame SV(t) in the virtual viewpoint video at a ratio of (1−α) to α.

In S208, the ratio adjustment unit 105 proceeds to S205 in the case where the elapsed period from the switch time N to the time t is less than the switch interval Np and proceeds to S206 in the case where the elapsed period from the switch time N to the time t is the switch interval Np or more.

In S209, the ratio adjustment unit 105 updates the coefficient α to (t−N)/Np according to Formula 3 described above and proceeds to S203.

In S210, the ratio adjustment unit 105 updates the coefficient α to "1" according to Formula 3 described above and proceeds to S203.

S112 and S113 are the same as those in Embodiment 1.

In the embodiment, strangeness felt by the viewer in switching of the video can be further reduced by matching the composition of the virtual viewpoint video and the composition of the captured video and then performing the a blending on the virtual viewpoint video and the captured video to perform switching between the videos stepwise.

Although the virtual viewpoint control unit 103 outputs only the virtual viewpoint parameters at the time t as the control information to the image processing apparatus 30 in S104 in Embodiments 1 and 2, the virtual viewpoint control unit 103 may output the virtual viewpoint parameters at all of the times to the image processing apparatus 30 before the generation of the virtual viewpoint video. In the case where all virtual viewpoint parameters are outputted to the image processing apparatus 30 at once as described above, the virtual viewpoint control unit 103 then only has to output just the variable t as the control information to the image processing apparatus 30. Moreover, in this case, the image processing apparatus 30 may generate the frames in advance based on the received virtual viewpoint parameters and perform buffering before the reception of the variable t from the virtual viewpoint control unit 103. Then, in response to the reception of the variable t as the control information from the virtual viewpoint control unit 103, the image processing apparatus 30 may read and output the frame corresponding to the time t among the buffered frames.

Moreover, although the frames 301 to 306 corresponding to a period from the start time S to the end time E are generated for the virtual viewpoint video in FIG. 3, the frames 304 to 306 in the virtual viewpoint video after the switch time N do not have to be generated. For example, the time control unit 102 may perform such control that the unnecessary frames 304 to 306 are not generated, by using the control information outputted to the image processing apparatus 30.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The disclosed technique can reduce the feeling of strangeness relating to the switching between the virtual viewpoint video and the captured video.

This application claims the benefit of Japanese Patent Application No. 2019-212303 filed Nov. 25, 2019, which is hereby incorporated by reference wherein in its entirety.

What is claimed is:

1. An information processing apparatus comprising:
one or more processors functioning by executing instructions stored in one or more memories as the following units:
an obtaining unit that obtains time information for specifying a switch time which is a time associated with a virtual viewpoint video generated based on a plurality of captured images captured by a plurality of imaging apparatuses and a captured video captured by a predetermined imaging apparatus;
a determining unit that determines, based on a position and a direction of the predetermined imaging apparatus capturing a video corresponding to the switch time specified based on the time information, a position of a virtual viewpoint and a direction of view from the virtual viewpoint used for generating the virtual viewpoint video corresponding to the switch time specified based on the obtained time information; and
a switching unit that switches an output video between the virtual viewpoint video corresponding to the determined position of the virtual viewpoint and the determined direction of view from the virtual viewpoint and the captured video corresponding to the switch time captured by the predetermined imaging apparatus.

2. The information processing apparatus according to claim 1, wherein
the determining unit determines a position of a virtual viewpoint and a direction of view from the virtual viewpoint such that a composition of the virtual viewpoint video corresponding to the switch time and a composition of the captured video corresponding to the switch time captured by the predetermined imaging apparatus are same.

3. The information processing apparatus according to claim 1, wherein the one or more processors further function as the following unit:
a generating unit that generates the virtual viewpoint video based on the determined position of the virtual viewpoint and the determined direction of view from the virtual viewpoint.

4. The information processing apparatus according to claim 1, wherein the one or more processors further function as the following unit:
a control unit that controls a time of the virtual viewpoint video and a time of the captured video captured by the predetermined imaging apparatus such that the time of the virtual viewpoint video and the time of the captured video at the switch time are synchronous.

5. The information processing apparatus according to claim 1, wherein the switching unit switches between the virtual viewpoint video corresponding to the determined position of the virtual viewpoint and the determined direction of view from the virtual viewpoint and the captured video corresponding to the switch time captured by the predetermined imaging apparatus by synthesizing the virtual viewpoint video corresponding to the determined position of the virtual viewpoint and the determined direction of view from the virtual viewpoint and the captured video corresponding to the switch time captured by the predetermined imaging apparatus at a predetermined synthesis ratio.

6. The information processing apparatus according to claim 5, wherein
the time information represents a time range as the switch time, and
the switching unit switches between the virtual viewpoint video corresponding to the determined position of the virtual viewpoint and the determined direction of view from the virtual viewpoint and the captured video corresponding to the switch time captured by the predetermined imaging apparatus by changing a synthesis ratio of the virtual viewpoint video corresponding to the determined position of the virtual viewpoint and the determined direction of view from the virtual viewpoint and the captured video corresponding to the switch time captured by the predetermined imaging apparatus in the time range represented by the time information.

7. The information processing apparatus according to claim 6, wherein
the time range is a period based on a switch start time and a switch end time.

8. The information processing apparatus according to claim 1, wherein
the determining unit determines an angle of view of the virtual viewpoint corresponding to the switch time based on an angle of view of the predetermined imaging apparatus capturing a video corresponding to the switch time.

9. An information processing method comprising:
obtaining time information for specifying a switch time which is a time associated with a virtual viewpoint video generated based on a plurality of captured images captured by a plurality of imaging apparatuses and a captured video captured by a predetermined imaging apparatus;
determining, based on a position and a direction of the predetermined imaging apparatus capturing a video corresponding to the switch time specified based on the time information, a position of a virtual viewpoint and a direction of view from the virtual viewpoint used for generating the virtual viewpoint video corresponding to the switch time specified based on the obtained time information; and
switching an output video between the virtual viewpoint video corresponding to the determined position of the virtual viewpoint and the determined direction of view from the virtual viewpoint and the captured video corresponding to the switch time captured by the predetermined imaging apparatus.

10. A non-transitory computer readable storage medium storing a program that causes a computer to execute an information processing method comprising:
obtaining time information for specifying a switch time which is a time associated with a virtual viewpoint video generated based on a plurality of captured images captured by a plurality of imaging apparatuses and a captured video captured by a predetermined imaging apparatus;
determining, based on a position and a direction of the predetermined imaging apparatus capturing a video corresponding to the switch time specified based on the time information, a position of a virtual viewpoint and a direction of view from the virtual viewpoint used for generating the virtual viewpoint video corresponding to the switch time specified based on the obtained time information; and
switching an output video, between the virtual viewpoint video corresponding to the determined position of the virtual viewpoint and the determined direction of view from the virtual viewpoint and the captured video corresponding to the switch time captured by the predetermined imaging apparatus.

11. The information processing apparatus according to claim 1, wherein
the determining unit determines a position and a direction of the predetermined imaging apparatus capturing a video corresponding to the switch time as a position of a virtual viewpoint and a direction of view from the virtual viewpoint for generating the virtual viewpoint video corresponding to the switch time.

12. The information processing apparatus according to claim 4, wherein
the control unit causes at least one of an output of the virtual viewpoint video and an output of the captured video captured by the predetermined imaging apparatus to be delayed for synchronizing the time in the virtual viewpoint video and the time in the captured video.

13. The information processing apparatus according to claim 6, wherein
the time range is represented the number of frames of the output video.

* * * * *